US012620387B2

(12) United States Patent
Cai et al.

(10) Patent No.: US 12,620,387 B2
(45) Date of Patent: May 5, 2026

(54) VOICE GENERATION METHOD AND APPARATUS, DEVICE, AND COMPUTER READABLE MEDIUM

(71) Applicant: BEIJING BYTEDANCE NETWORK TECHNOLOGY CO., LTD., Beijing (CN)

(72) Inventors: Meng Cai, Beijing (CN); Yalu Kong, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 295 days.

(21) Appl. No.: 18/041,756

(22) PCT Filed: Jul. 30, 2021

(86) PCT No.: PCT/CN2021/109550
§ 371 (c)(1),
(2) Date: Feb. 15, 2023

(87) PCT Pub. No.: WO2022/037388
PCT Pub. Date: Feb. 24, 2022

(65) Prior Publication Data
US 2024/0029709 A1      Jan. 25, 2024

(30) Foreign Application Priority Data

Aug. 17, 2020    (CN) ......................... 202010823774.X

(51) Int. Cl.
*G10L 17/02*        (2013.01)
*G06F 40/47*        (2020.01)
*G10L 13/08*        (2013.01)

(52) U.S. Cl.
CPC ............ *G10L 13/086* (2013.01); *G06F 40/47* (2020.01); *G10L 17/02* (2013.01)

(58) Field of Classification Search
CPC .......... G06F 40/30; G06F 3/14; G06F 40/166; G06F 40/20; G06N 5/022; G06N 3/0455; G06N 3/09
See application file for complete search history.

(56) References Cited

U.S. PATENT DOCUMENTS 7,668,718 B2 *   2/2010   Kahn .................... G10L 15/063
                                                   704/270
10,930,263 B1 *  2/2021   Mahyar .................. G06N 3/088
(Continued)

FOREIGN PATENT DOCUMENTS

CN          104091592 A  * 10/2014  ..... G10L 2021/0135
CN          104756181 A    7/2015
(Continued)

OTHER PUBLICATIONS

International Patent Application No. PCT/CN2021/109550; Int'l Search Report; dated Oct. 22, 2021; 3 pages.
(Continued)

*Primary Examiner* — Paras D Shah
*Assistant Examiner* — Mulugeta Tuji Dugda
(74) *Attorney, Agent, or Firm* — BakerHostetler

(57)                    ABSTRACT

A voice generation method and apparatus, an electronic device, and a computer readable storage medium. Said method comprises: performing speaker segmentation on an original voice to determine starting time and ending time of each speaking voice segment in the original voice, so as to obtain segmented voices; determining a voiceprint feature vector corresponding to each speaking voice segment in the original voice; converting a text corresponding to each speaking voice segment in the original voice into a target language text, to obtain a target language text corresponding to each speaking voice segment in the original voice; and generating a target voice on the basis of the starting time and the ending time of each speaking voice segment in the
(Continued)

Computing device 101

Hello my name is ZhangSan
Hello my name is LiSi

{0.2s-0.4s,
0.5s-0.7s,
0.8s-1.0s,
1.5s-1.8s,
2.0s-2.5s,
2.7s-3.0s}

(V1, V1, V1,
V2, V2, V2)

Hello my name is ZhangSan
Hello my name is LiSi

{0.23, 0.78, 0.53, 0.64}
{0.71, 0.42, 0.37, 0.82} original voice, the voiceprint feature vectors corresponding to the speaking voice segments and the target language texts corresponding to the speaking voice segments.

15 Claims, 4 Drawing Sheets

(56)                    References Cited

U.S. PATENT DOCUMENTS

| | | | |
|---|---|---|---|
| 2009/0089066 A1 * | 4/2009 | Gao | G10L 13/00 |
| | | | 704/277 |
| 2009/0306981 A1 * | 12/2009 | Cromack | G06F 16/685 |
| | | | 707/E17.103 |
| 2010/0004937 A1 | 1/2010 | Schlosser | |
| 2013/0144597 A1 * | 6/2013 | Waibel | G10L 15/18 |
| | | | 704/2 |
| 2013/0211818 A1 * | 8/2013 | Sakamoto | G06F 40/58 |
| | | | 704/2 |
| 2014/0303958 A1 * | 10/2014 | Lee | G06F 40/58 |
| | | | 704/2 |
| 2017/0076713 A1 | 3/2017 | Gildein, II et al. | |
| 2017/0270965 A1 | 9/2017 | Bao et al. | |
| 2018/0197548 A1 | 7/2018 | Palakodety et al. | |
| 2019/0244623 A1 * | 8/2019 | Hall | G06T 13/40 |
| 2020/0211565 A1 * | 7/2020 | Dubinsky | H04N 21/234336 |
| 2020/0226327 A1 * | 7/2020 | Matusov | G06N 3/045 |

FOREIGN PATENT DOCUMENTS

| | | | | | |
|---|---|---|---|---|---|
| CN | 105975569 A | 9/2016 | | | |
| CN | 106782545 A | 5/2017 | | | |
| CN | 106791913 A | 5/2017 | | | |
| CN | 107657947 A | 2/2018 | | | |
| CN | 107749296 A | 3/2018 | | | |
| CN | 107993665 A | * | 5/2018 | | G10L 17/04 |
| CN | 108305633 A | | 7/2018 | | |
| CN | 108461079 A | * | 8/2018 | | G10L 13/02 |
| CN | 108780643 A | | 11/2018 | | |
| CN | 110335612 A | | 10/2019 | | |
| CN | 110381389 A | | 10/2019 | | |
| CN | 110730952 A | * | 1/2020 | | G06F 40/205 |
| CN | 110853615 A | | 2/2020 | | |
| CN | 110914828 A | | 3/2020 | | |
| CN | 111050201 A | | 4/2020 | | |
| CN | 111161710 A | | 5/2020 | | |
| CN | 111276129 A | | 6/2020 | | |
| CN | 111462727 A | | 7/2020 | | |
| CN | 111916053 A | | 11/2020 | | |
| WO | WO-2018055983 A1 | * | 3/2018 | | G06F 3/16 |
| WO | WO-2019175574 A1 | * | 9/2019 | | G06F 40/58 |

OTHER PUBLICATIONS

International Search Report for International Application No. PCT/CN2021/117199, mailed Dec. 17, 2021, 5 pages.
Written Opinion for International Application No. PCT/CN2021/109550, mailed Oct. 22, 2021, 9 Pages.
Jiang Xiaomei; "Fundatmental of Simultaneous Interpretation"; Wuhan University Press; https://img.duxiu.com/n/jpgfs/book/base/14534262/1705c4f1fa274a97aac8ed086c4141e5/b2f4d71d8b80800832eab357fc5d84b289.shtml?uf=1&t=1; accessed Aug. 2021; 10 pages.

* cited by examiner

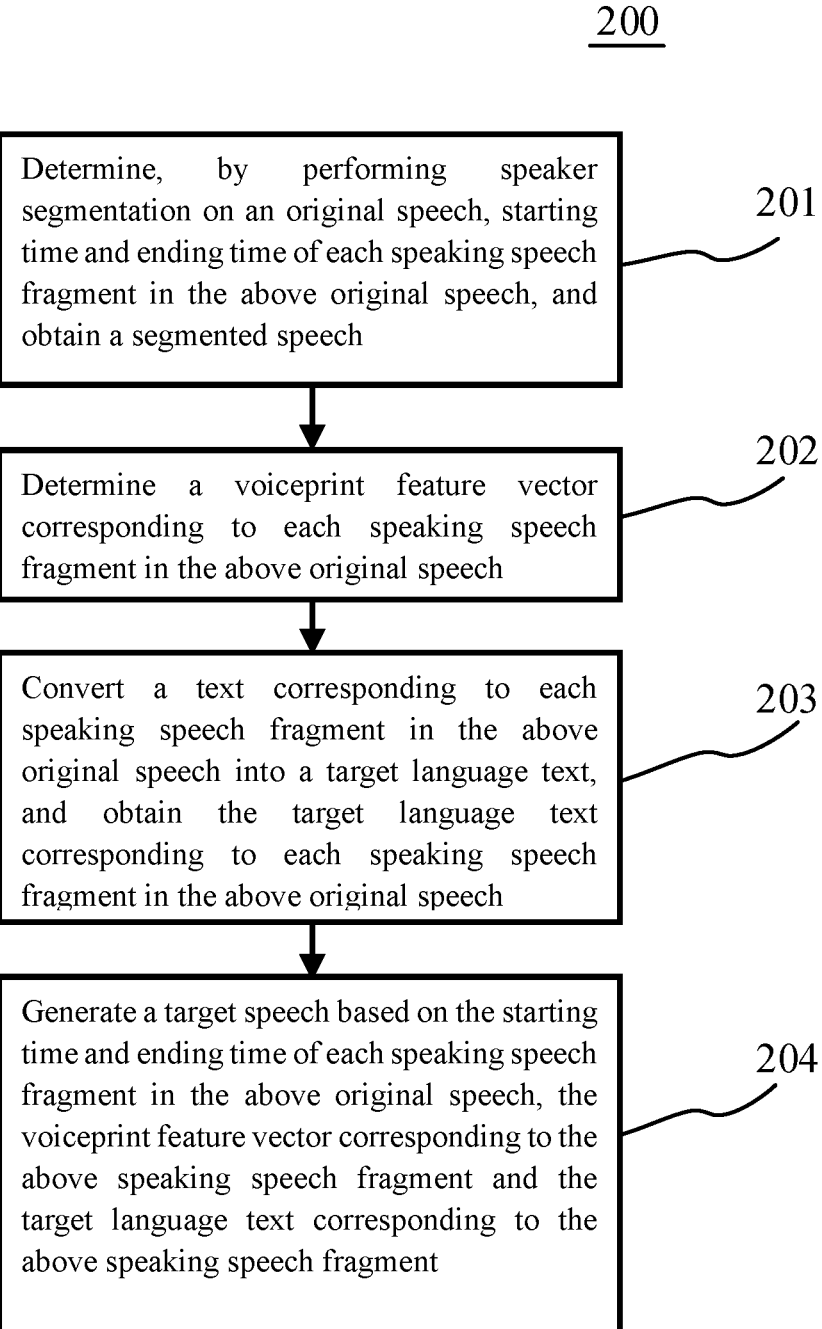

200

Determine, by performing speaker segmentation on an original speech, starting time and ending time of each speaking speech fragment in the above original speech, and obtain a segmented speech                    201

Determine a voiceprint feature vector corresponding to each speaking speech fragment in the above original speech                    202

Convert a text corresponding to each speaking speech fragment in the above original speech into a target language text, and obtain the target language text corresponding to each speaking speech fragment in the above original speech                    203

Generate a target speech based on the starting time and ending time of each speaking speech fragment in the above original speech, the voiceprint feature vector corresponding to the above speaking speech fragment and the target language text corresponding to the above speaking speech fragment                    204

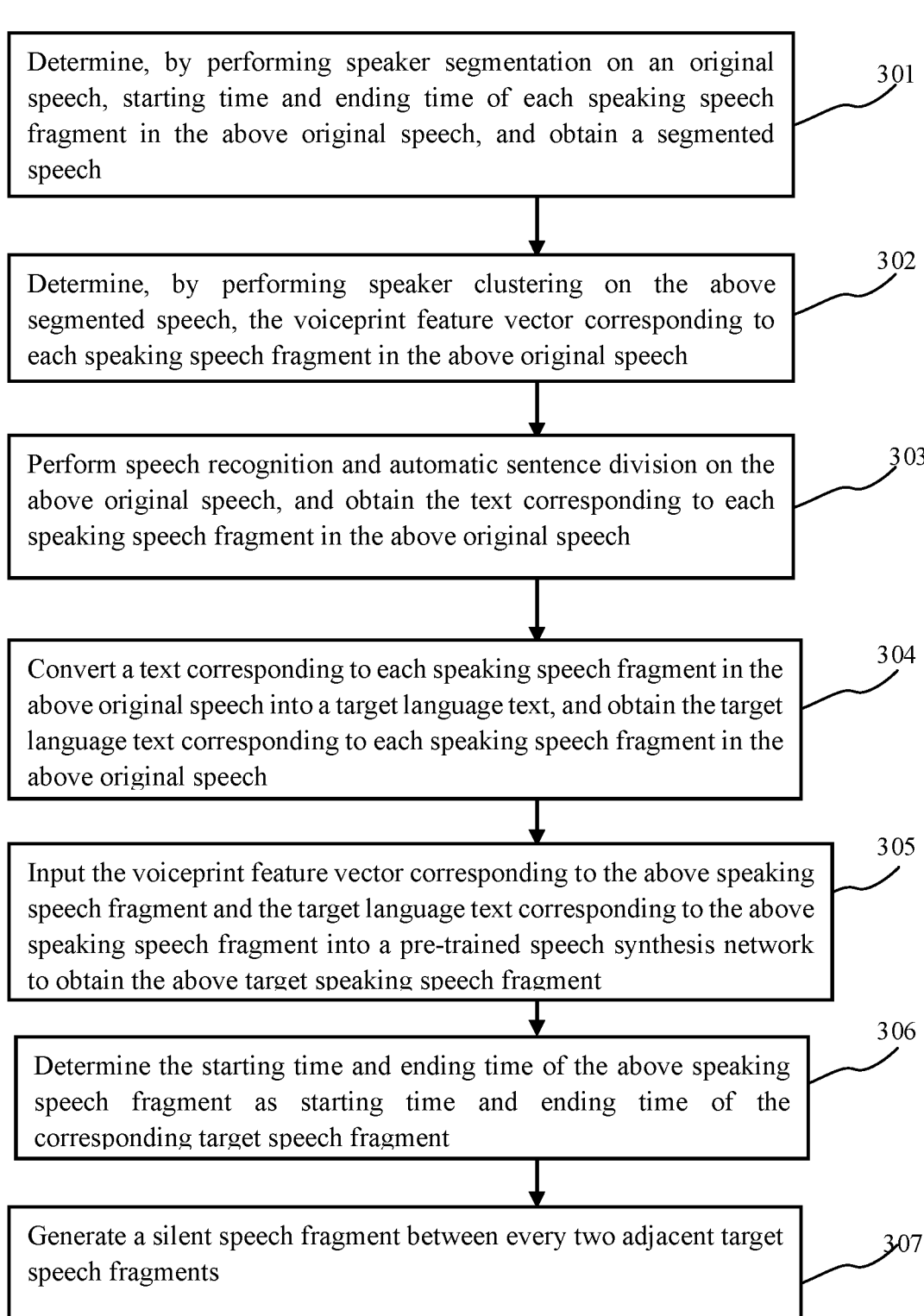

301 Determine, by performing speaker segmentation on an original speech, starting time and ending time of each speaking speech fragment in the above original speech, and obtain a segmented speech 302 Determine, by performing speaker clustering on the above segmented speech, the voiceprint feature vector corresponding to each speaking speech fragment in the above original speech 303 Perform speech recognition and automatic sentence division on the above original speech, and obtain the text corresponding to each speaking speech fragment in the above original speech 304 Convert a text corresponding to each speaking speech fragment in the above original speech into a target language text, and obtain the target language text corresponding to each speaking speech fragment in the above original speech 305 Input the voiceprint feature vector corresponding to the above speaking speech fragment and the target language text corresponding to the above speaking speech fragment into a pre-trained speech synthesis network to obtain the above target speaking speech fragment 306 Determine the starting time and ending time of the above speaking speech fragment as starting time and ending time of the corresponding target speech fragment 307 Generate a silent speech fragment between every two adjacent target speech fragments

VOICE GENERATION METHOD AND APPARATUS, DEVICE, AND COMPUTER READABLE MEDIUM

CROSS REFERENCE TO RELATED APPLICATIONS

The present application is the U.S. National Stage of International Application No. PCT/CN2021/109550, filed on Jul. 30, 2021, which claims priority to the Chinese Patent Application No. 202010823774.X, filed to China Patent Office on Aug. 17, 2020, and entitled "VOICE GENERATION METHOD AND APPARATUS, DEVICE, AND COMPUTER READABLE MEDIUM", both of which are incorporated herein by reference in their entireties.

FIELD

Embodiments of the present disclosure relate to the technical field of computers, in particular to a speech generating method and apparatus, a device and a computer readable medium.

BACKGROUND

It takes a lot of manpower to convert an audio/video file in a first language into an audio/video file in a second language. It cannot be ensured that a time node of a speaking speech fragment in the audio/video file in the second language corresponds to that in the audio/video file in the first language, and it cannot be ensured that voiceprint features thereof are similar, so an automatic translating and dubbing technology is in demand.

SUMMARY

The summary part of the present disclosure is used to introduce ideas in a simple way. Such ideas will be described in detail in the following implementation part. The summary part of the present disclosure is not intended to mark any key features or essential features of claimed technical solutions, nor is it used to limit the scope of the claimed technical solutions.

Some embodiments of the present disclosure propose a speech generating method and apparatus, a device and a computer readable medium, so as to solve the technical problem mentioned in the above background.

In a first aspect, some embodiments of the present disclosure provide a speech generating method, comprising: determining starting time and ending time of each speaking speech fragment in the original speech by performing speaker segmentation on an original speech to obtain a segmented speech; determining a voiceprint feature vector corresponding to each speaking speech fragment in the original speech; converting a text corresponding to each speaking speech fragment in the original speech into a target language text, to obtain the target language text corresponding to each speaking speech fragment in the original speech; and generating a target speech based on the starting time and ending time of each speaking speech fragment in the original speech, the voiceprint feature vector corresponding to each speaking speech fragment and the target language text corresponding to the speaking speech fragment.

In a second aspect, some embodiments of the present disclosure provide a speech generating apparatus, comprising: a first determining unit configured to determine starting time and ending time of each speaking speech fragment in the original speech by performing speaker segmentation on an original speech to obtain a segmented speech; a second determining unit configured to determine a voiceprint feature vector corresponding to each speaking speech fragment in the original speech; a converting unit configured to convert a text corresponding to each speaking speech fragment in the original speech into a target language text, to obtain the target language text corresponding to each speaking speech fragment in the original speech; and a generating unit configured to generate a target speech based on the starting time and ending time of each speaking speech fragment in the original speech, the voiceprint feature vector corresponding to each speaking speech fragment and the target language text corresponding to the speaking speech fragment.

In a third aspect, some embodiments of the present disclosure provide an electronic device, including: one or more processors; and a storage apparatus, one or more programs are stored therein. The one or more programs, when executed by the one or more processors, cause the one or more processors to implement any one of methods in the first aspect.

In a fourth aspect, some embodiments of the present disclosure provide a computer readable medium, computer programs are stored therein. The programs, when executed by a processor, cause the processor to implement any one of the methods in the first aspect.

One of the above embodiments of the present disclosure has the following beneficial effects: automatically converting an audio/video file in a first language into an audio/video file in a second language.

BRIEF DESCRIPTION OF THE DRAWINGS

The above and other features, advantages and aspects of the embodiments of the present disclosure will become clearer in combination with the accompanying drawings and with reference to the following specific implementations. Throughout the accompanying drawings, the same or similar reference signs represent the same or similar elements. It should be understood that the accompanying drawings are merely illustrative and members and elements are not necessarily drawn in proportion.

FIG. 2 is a flow chart of some embodiments of a speech generating method according to the present disclosure.

FIG. 3 is a flow chart of some other embodiments of a speech generating method according to the present disclosure.

DETAILED DESCRIPTION OF THE EMBODIMENTS

The embodiments of the present disclosure will be described in more detail below with reference to the appended drawings. Although some of the embodiments of the present disclosure are shown in the appended drawings, it should be understood that the disclosure can be implemented in various forms and should not be construed to be limited to the implementations described here. Instead, these implementations are provided for a more thorough and complete understanding of this disclosure. It should be understood that the appended drawings and implementations of the present disclosure are for illustrative purposes only and are not intended to limit the scope of protection of the present disclosure.

It should also be noted that, for ease of description, only the parts related to the invention are shown in the attached drawings. Without conflict, the features of the embodiments and the implementations in this disclosure may be combined with each other.

It is noted that the concepts of "first" and "second" mentioned in the disclosure are used only to distinguish between different devices, modules or units and not to define the order or interdependence of the functions performed by these devices, modules or units.

It is noted that the modifications to "one" and "many" mentioned in the disclosure are schematic and not restrictive, and one in the field should understand that they should be interpreted as "one or more" unless otherwise explicitly stated in the context.

The names of messages or information interacted between multiple devices in the implementation of the present disclosure are used for illustrative purposes only and are not used to limit the scope of these messages or information.

The disclosure will be described in detail below with reference to the appended drawings and in combination with the implementation.

Figure 1:
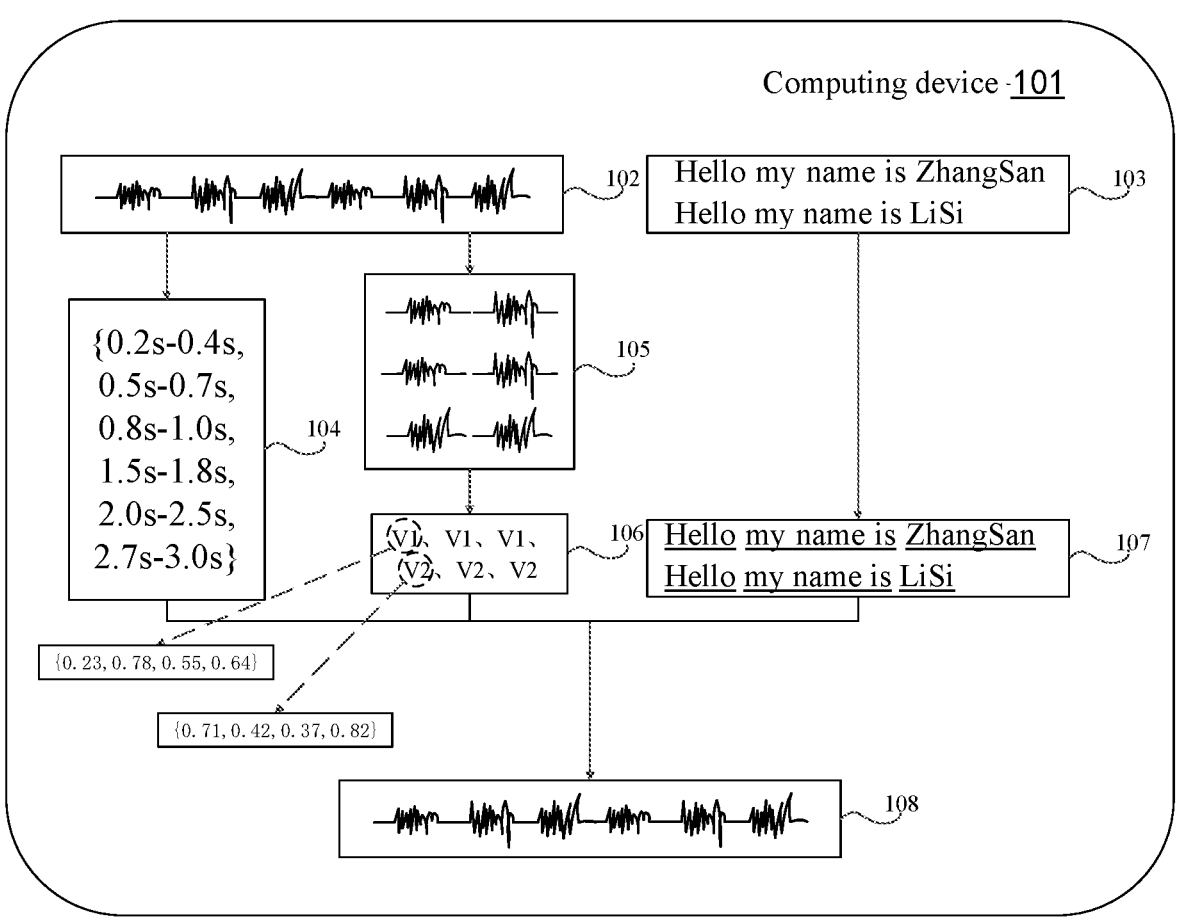
FIG. 1 is a schematic diagram of an application scene of a speech generating method according to some embodiments of the present disclosure.

FIG. 1 illustrates a schematic diagram of an application scene where a speech generating method of some embodiments of the present disclosure may be applied.

In the application scene illustrated in FIG. 1, a computing device 101 may first determine, by performing speaker segmentation on an original speech 102, starting time and ending time of each speaking speech fragment in the original speech, and obtain a segmented speech 105. For example, in the application scene, starting time and ending time of the first speaking speech fragment in the above original speech 102 are "0.2 s-0.4 s". Then, the computing device determines a voiceprint feature vector 106 corresponding to each speaking speech fragment in the above original speech. In the application scene, the above computing device 101 determines two different voiceprint feature vectors "V1" and "V2" in the above original speech 102. As an instance, a value of the above voiceprint feature vector "V1" may be "{0.23, 0.78, 0.55, 0.64}" indicated by a dotted line in FIG. 1. Afterwards, a text 103 corresponding to each speaking speech fragment in the above original speech 102 is converted into a target language text, and the target language text 107 corresponding to each speaking speech fragment in the above original speech 102 is obtained. In the application scene, the above original speech 102 contains 6 speaking speech fragments, the texts corresponding to the speaking speech fragments are respectively "你好", "我叫", "张三", "你好", "我叫", and "李四", and the above target language text is an English text. On this basis, the target language texts corresponding to the speaking speech fragments in the above original speech 102 are respectively "Hello", "my name is", "ZhangSan", "Hello", "my name is", and "LiSi". Finally, a target speech 108 is generated based on the starting time and ending time of each speaking speech fragment in the above original speech, the voiceprint feature vector 106 corresponding to the above speaking speech fragment and the target language text 107 corresponding to the above speaking speech fragment.

It should be noted that, the above computing device 101 may be hardware, or may be software. When the computing device is the hardware, it may be implemented into a distributed cluster composed of a plurality of servers or electronic devices, or it may be implemented as a single server or a single electronic device. When the computing device is embodied as the software, it may be implemented as, for example, a plurality of software or software modules for providing distributed services, or it may be implemented as a single software or software module. No specific limitation is made here.

It should be understood that the number of computing devices 101 in FIG. 1 is merely illustrative. Depending on implementation needs, there may be any number of computing devices 101.

FIG. 2 illustrates a flow 200 of some embodiments of a speech generating method according to the present disclosure. The speech generating method includes the following steps:

Step 201, by performing speaker segmentation on an original speech, starting time and ending time of each speaking speech fragment in the above original speech are determined, and a segmented speech is obtained.

In some embodiments, the above original speech may be a speech containing at least one speaking speech fragment.

In some embodiments, an executing body of the speech generating method (for example, the computing device shown in FIG. 1) may perform speaker segmentation on the above original speech by receiving manually input segmenting labels, so as to determine the starting time and ending time of each speaking speech fragment in the above original speech and obtain the segmented speech.

In some embodiments, the above executing body may also use an unsupervised method based on clustering to perform speaker segmentation on the original speech, thereby determining the starting time and ending time of each speaking speech fragment in the above original speech, and obtaining the segmented speech.

In some embodiments, the above executing body may also use a supervised method based on a recurrent neural network (RNN) to perform speaker segmentation on the original speech, thereby determining the starting time and ending time of each speaking speech fragment in the above original speech, and obtaining the segmented speech.

Step 202, a voiceprint feature vector corresponding to each speaking speech fragment in the above original speech is determined.

In some embodiments, the above voiceprint feature vector may be a result of vectorizing extracted voiceprint feature data. The above voiceprint feature may include but is not limited to: Linear Predictor Coefficient (LPC), Mel Frequency Cepstrum Coefficients (MFCC), and Perceptual Linear Predictive (PLP).

In some embodiments, the above executing body may perform speaker recognition on the above speaking speech fragment to obtain the voiceprint feature vector corresponding to the above speaking speech fragment.

In some optional implementations of some embodiments, the above executing body may also perform speaker clustering on the above segmented speech to determine the voiceprint feature vector corresponding to each speaking speech fragment in the original speech.

Step 203, a text corresponding to each speaking speech fragment in the above original speech is converted into a target language text to obtain the target language text corresponding to each speaking speech fragment in the above original speech.

In some embodiments, the text corresponding to each speaking speech fragment in the above original speech may be obtained in advance. For example, a text corresponding to an original speech in a video is subtitles, and the subtitles are usually available.

In some optional implementations of some embodiments, the above executing body may perform speech recognition and automatic sentence division on the above original speech to obtain the text corresponding to each speaking speech fragment in the above original speech.

In some embodiments, the above executing body may convert the text corresponding to the above speech into the target language text by inputting the text corresponding to the above speech into translation software or an online translation tool or translation network.

In some embodiments, the above executing body may also convert the text corresponding to the above speech into the target language text through a manner of receiving manual input.

Step 204, a target speech is generated based on the starting time and ending time of each speaking speech fragment in the above original speech, the voiceprint feature vector corresponding to each speaking speech fragment and the target language text corresponding to the above speaking speech fragment.

In some embodiments, the above executing body may first generate target speech fragments based on the starting time and ending time of each speaking speech fragment in the above original speech, the voiceprint feature vector corresponding to the above speaking speech fragment and the target language text corresponding to the above speaking speech fragment, and then splice the above target speech fragments to obtain the above target speech.

In some embodiments, for each speaking speech fragment in the above original speech, the above executing body may first extract a vocal feature from the above target language text and convert the same into a vocal feature vector. Then the above voiceprint feature vector and the above vocal feature vector are input into a pre-trained vocoder to obtain a first speaking speech fragment. Finally, acceleration or deceleration processing is performed on the above first speaking speech fragment according to the above starting time and ending time, to obtain the target speech fragment.

In some optional implementations of some embodiments, the above executing body may generate the above target speech through the following steps:

Step 1, the target speaking speech fragment is generated based on the voiceprint feature vector corresponding to each speaking speech fragment in the above original speech and the target language text corresponding to the speaking speech fragment, and a target speaking speech fragment set is obtained.

In some embodiments, the above executing body may first extract the vocal feature from the above target language text and convert the same into the vocal feature vector. Then the above voiceprint feature vector and the above vocal feature vector are input into the pre-trained vocoder to obtain the above target speaking speech fragment.

In some optional implementations of some embodiments, the above executing body may input the voiceprint feature vector corresponding to the speaking speech fragment and the target language text corresponding to the speaking speech fragment into a pre-trained speech synthesis network to obtain the target speaking speech fragment.

In some embodiments, the above speech synthesis network may be a network constituted by a vocal feature extracting network and the vocoder. As an instance, the above vocal feature extracting network includes but is not limited to: a hidden Markov model based on a deep neural network, a recurrent neural network, a long short-term memory network, etc. The above vocoder is a speech analysis and synthesis system that performs speech synthesis based on vocal features.

Step 2, based on the starting time and ending time of each speaking speech fragment in the above original speech, the target speaking speech fragments in the target speaking speech fragment set are spliced to obtain the target speech.

In some embodiments, the above executing body may splice the segments according to a sequential order of time nodes.

In some optional implementations of some embodiments, the above executing body may determine the starting time and ending time of the speaking speech fragment as the starting time and ending time of the corresponding target speech fragment. Then, a silent speech fragment is generated between every two adjacent target speech fragments to obtain the above target speech. A duration of the silent speech fragment is a difference between the starting time of the latter target speech fragment in the two adjacent target speech fragments and the ending time of the former target speech fragment.

The method provided by some embodiments of the present disclosure realizes automatic conversion of an audio/video file in a first language into an audio/video file in a second language.

FIG. 3 illustrates a flow 300 of some other embodiments of a speech generating method. The flow 300 of the speech generating method includes the following steps:

Step 301, by performing speaker segmentation on an original speech, starting time and ending time of each speaking speech fragment in the above original speech are determined, and a segmented speech is obtained.

In some embodiments, for specific implementation of step 301 and technical effects brought thereby, reference may be made to step 201 in the embodiment corresponding to FIG. 2, and the repetition will not be made here.

Step 302, by performing speaker clustering on the above segmented speech, a voiceprint feature vector corresponding to each speaking speech fragment in the above original speech is determined.

In some embodiments, an executing body of the speech generating method may use a clustering algorithm to perform speaker clustering on the above segmented speech. As an instance, the above clustering algorithm may include but is not limited to: a partitioned clustering method, a density-based clustering method, and a hierarchical clustering method.

Step 303, speech recognition and automatic sentence division are performed on the above original speech to obtain a text corresponding to each speaking speech fragment in the above original speech.

In some embodiments, the above executing body may use a speech recognition network to perform speech recognition on the above original speech, and then perform automatic sentence division on a recognition result. As an instance, the above executing body may use a sentence division model to perform automatic sentence division on the above original speech.

In some embodiments, the above executing body may also use an online speech recognition tool or speech recognition software to perform speech recognition on the above original speech, and then perform automatic sentence division on the recognition result.

Step 304, the text corresponding to each speaking speech fragment in the above original speech is converted into a target language text to obtain the target language text corresponding to each speaking speech fragment in the above original speech.

In some embodiments, for specific implementation of step 304 and technical effects brought thereby, reference may be made to step 203 in the embodiment corresponding to FIG. 2, and the repetition will not be made here.

Step 305, a voiceprint feature vector corresponding to the above speaking speech fragment and the target language text corresponding to the above speaking speech fragment are input into a pre-trained speech synthesis network to obtain the above target speaking speech fragment.

Step 306, the starting time and ending time of the above speaking speech fragment are determined as starting time and ending time of the corresponding target speech fragment.

Step 307, a silent speech fragment is generated between every two adjacent target speech fragments. A duration of the above silent speech fragment is a difference between the starting time of the latter target speech fragment in the two adjacent target speech fragments and the ending time of the former target speech fragment.

It can be seen from FIG. 3 that, compared with description of some embodiments corresponding to FIG. 2, a solution described by some embodiments corresponding to FIG. 3 performs speech recognition and automatic sentence division on the original speech, and obtains the text corresponding to each speaking speech fragment in the above original speech, so that the obtained texts are more reliable than texts obtained in advance. In addition, through steps 305-307, the time nodes of the speaking speech fragments in the generated target speech correspond to those of the original speech.

Figure 4:
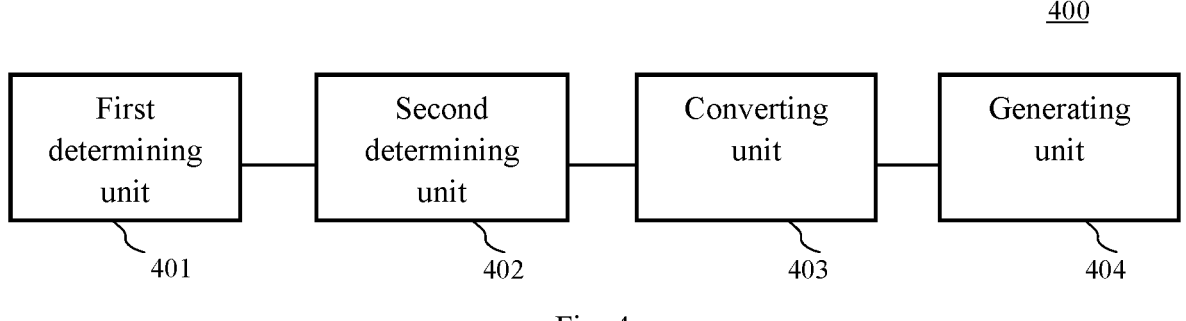
FIG. 4 is a schematic structural diagram of some embodiments of a speech generating apparatus according to the present disclosure.

Further referring to FIG. 4, as implementation of the method shown in the above drawings, the present disclosure provides some embodiments of a speech generating apparatus. These apparatus embodiments correspond to the method embodiments shown in FIG. 2, and the apparatus may specifically be applied to various electronic devices.

As shown in FIG. 4, the speech generating apparatus 400 in some embodiments includes: a first determining unit 401, a second determining unit 402, a converting unit 403 and a generating unit 404. The first determining unit 401 is configured to determine, by performing speaker segmentation on an original speech, starting time and ending time of each speaking speech fragment in the above original speech, and obtain a segmented speech; the second determining unit 402 is configured to determine a voiceprint feature vector corresponding to each speaking speech fragment in the above original speech; the converting unit 403 is configured to convert a text corresponding to each speaking speech fragment in the above original speech into a target language text, and obtain the target language text corresponding to each speaking speech fragment in the above original speech; and the generating unit 404 is configured to generate a target speech based on the starting time and ending time of each speaking speech fragment in the above original speech, the voiceprint feature vector corresponding to the above speaking speech fragment and the target language text corresponding to the above speaking speech fragment.

In some optional implementations of some embodiments, the second determining unit 402 is further configured to: determine, by performing speaker clustering on the segmented speech, the voiceprint feature vector corresponding to each speaking speech fragment in the original speech.

In some optional implementations of some embodiments, the generating unit 404 is further configured to: generate, based on the voiceprint feature vector corresponding to each speaking speech fragment in the original speech and the target language text corresponding to the speaking speech fragment, a target speaking speech fragment, and obtain a target speaking speech fragment set.

In some optional implementations of some embodiments, the generating unit 404 is further configured to: generate, based on the voiceprint feature vector corresponding to each speaking speech fragment in the original speech and the target language text corresponding to the speaking speech fragment, a target speaking speech fragment, and obtain a target speaking speech fragment set; and splice, based on the starting time and ending time of each speaking speech fragment in the original speech, the target speaking speech fragments in the target speaking speech fragment set, and obtain the target speech.

In some optional implementations of some embodiments, the generating unit 404 is further configured to: input the voiceprint feature vector corresponding to the speaking speech fragment and the target language text corresponding to the speaking speech fragment into a pre-trained speech synthesis network to obtain the target speaking speech fragment and further obtain a target speaking speech fragment set.

In some optional implementations of some embodiments, the generating unit 404 is further configured to: generate, based on the voiceprint feature vector corresponding to each speaking speech fragment in the original speech and the target language text corresponding to the speaking speech fragment, a target speaking speech fragment, and obtain a target speaking speech fragment set; determine the starting time and ending time of the speaking speech fragment as starting time and ending time of the corresponding target speech fragment; and generate a silent speech fragment between every two adjacent target speech fragments, wherein a duration of the silent speech fragment is a difference between the starting time of the latter target speech fragment in the two adjacent target speech fragments and the ending time of the former target speech fragment.

In some optional implementations of some embodiments, the apparatus 400 further includes: a speech recognition and automatic sentence division unit, configured to perform speech recognition and automatic sentence division on the original speech, and obtain the text corresponding to each speaking speech fragment in the original speech.

It can be understood that, the units recorded in the apparatus 400 correspond to the steps in the method described with reference to FIG. 2. Therefore, the operations, features and caused beneficial effects described based on the method are applicable to the apparatus 400 and the units contained therein, so the repetition will not be made here.

Figure 5:
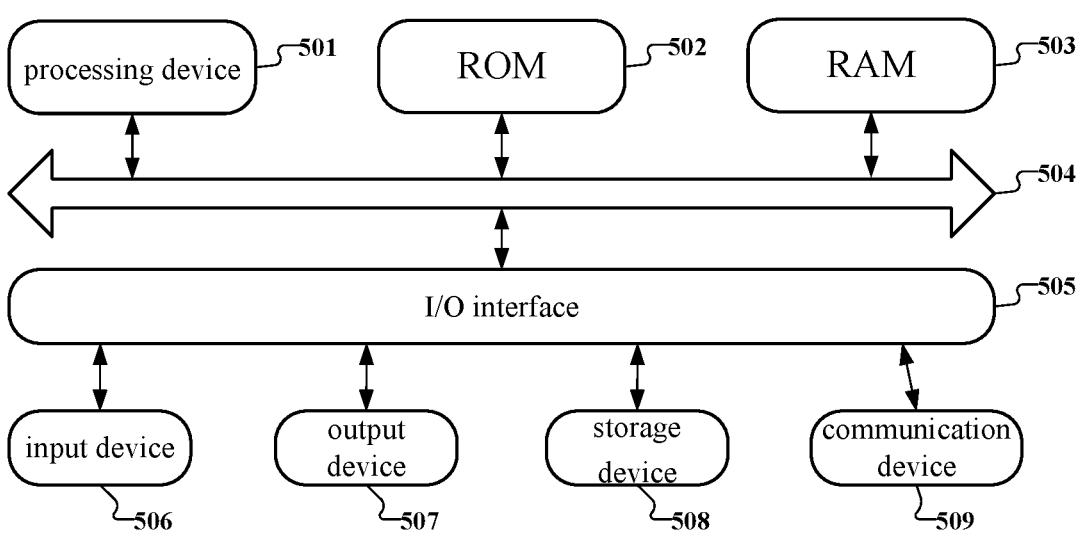
FIG. 5 is a schematic structural diagram of an electronic device used to implement some embodiments of the present disclosure.

Referring to FIG. 5 below, it shows a schematic structural diagram of an electronic device suitable for implementing some embodiments of the present disclosure, such as the electronic device in FIG. 1. In some embodiments of the present disclosure, the electronic devices may include, but are not limited to, mobile devices such as mobile phones, laptops, digital broadcast receivers, PDAs (personal digital assistants), PADs (tablets), PMPs (portable multimedia players), vehicle terminals (such as vehicle navigation terminals), and fixed terminals such as digital TV, desktop computers, and so on. The electronic device illustrated in FIG. 5 is only an example and should not impose any restrictions on the functionality and scope of use of the embodiments of this disclosure.

As shown in FIG. 5, an electronic device 500 may include a processing device (eg, a central processing unit, a graphics processor, etc.) 501 that may execute various appropriate actions and processes according to a program stored in a read only memory (ROM) 502 or a program be loaded into random access memory (RAM) 503 from a storage device 508. In the RAM 503, various programs and data necessary for the operation of the electronic device 500 are also stored. The processing device 501, the ROM 502, and the RAM 503 are connected to each other through a bus 504. An input/output (I/O) interface 505 is also connected to the bus 504.

Typically, the following devices can be connected to the I/O interface 505: an input device 506 including, for example, a touch screen, touch pad, keyboard, mouse, etc.; an output device 507 including, for example, a Liquid Crystal Display (LCD), speaker, vibrator, etc.; a storage device 508, including, for example, magnetic tape, hard disk, etc.; and a communication device 509. The communication device 509 may allow electronic device 500 to communicate wirelessly or by wire with other devices to exchange data. Although FIG. 5 shows an electronic device 500 having various devices, it should be understood that not all of the illustrated devices are required to be implemented or provided. More or fewer devices may alternatively be implemented or provided. Each block shown in FIG. 5 can represent one device, and can also represent multiple devices as required.

In particular, according to embodiments of the present application, the processes described above with reference to the flowcharts may be implemented as computer software programs. For example, embodiments of the present application include a computer program product comprising a computer program carried on a computer-readable medium, the computer program containing program code for performing the method illustrated in the flowchart. In such an embodiment, the computer program may be downloaded and installed from the network via the communication device 509, or from the storage device 508, or from the ROM 502. When the computer program is executed by the processing device 501, the above-mentioned functions defined in the methods of the embodiments of the present application are executed.

It should be noted that the computer-readable medium described in the embodiments of the present application may be a computer-readable signal medium or a computer-readable storage medium, or any combination thereof. The computer-readable storage medium can be, for example, but not limited to, an electrical, magnetic, optical, electromagnetic, infrared, or semiconductor system, apparatus or device, or a combination of thereof. More specific examples of computer readable storage media may include, but are not limited to, electrical connections with one or more wires, portable computer disks, hard disks, random access memory (RAM), read only memory (ROM), erasable Programmable read only memory (EPROM or flash memory), optical fiber, portable compact disk read only memory (CD-ROM), optical storage devices, magnetic storage devices, or any suitable combination thereof. In the embodiments of the present application, a computer-readable storage medium may be any tangible medium that contains or stores a program that can be used by or in conjunction with an instruction execution system, apparatus, or device. While in embodiments of the present application, a computer-readable signal medium may include a data signal in baseband or propagated as part of a carrier wave, carrying computer-readable program code therein. Such propagated data signals may take a variety of forms, including but not limited to electromagnetic signals, optical signals, or any suitable combination thereof. A computer-readable signal medium can also be any computer-readable medium other than a computer-readable storage medium, the computer-readable signal medium can transmit, propagate, or transport the program for use by or in connection with the instruction execution system, apparatus, or device. The program code contained on the computer-readable medium can be transmitted by any suitable medium, including but not limited to: electric wire, optical cable, RF (Radio Frequency, radio frequency), etc., or any suitable combination thereof.

In some embodiments, clients and servers can communicate using any currently known or future network protocol, such as HTTP (HyperText Transfer Protocol), and can be interconnected with any form or medium of digital data communication, such as a communication network. Examples of communication networks include a local area network ("LAN"), a wide area network ("WAN"), an Internet (for example, the Internet), and an end-to-end network (for example, an ad hoc end-to-end network), as well as any network currently known or developed in the future.

The computer-readable medium may be included in the above-mentioned electronic device; or may exist alone without being assembled into the electronic device. The computer-readable medium carries one or more programs, and when the one or more programs are executed by the server, cause the electronic device to: determine starting time and ending time of each speaking speech fragment in the original speech by performing speaker segmentation on an original speech to obtain a segmented speech; determine a voiceprint feature vector corresponding to each speaking speech fragment in the original speech; convert a text corresponding to each speaking speech fragment in the original speech into a target language text, to obtain the target language text corresponding to each speaking speech fragment in the original speech; and generate a target speech based on the starting time and ending time of each speaking speech fragment in the original speech, the voiceprint feature vector corresponding to each speaking speech fragment and the target language text corresponding to the speaking speech fragment.

Computer program code for performing the operations of the embodiments of the present application may be written in one or more programming languages, including object-oriented programming languages—such as Java, Smalltalk, C++, and including conventional procedural programming languages—such as the "C" language or similar programming languages. The program code may execute entirely on the user's computer, partly on the user's computer, as a stand-alone software package, partly on the user's computer and partly on a remote computer, or entirely on the remote computer or server. In the case of a remote computer, the remote computer may be connected to the user's computer through any kind of network, including a local area network (LAN) or a wide area network (WAN), or may be connected to an external computer (eg, using an Internet service provider via Internet connection).

The flowchart and block diagrams in the Figures illustrate the architecture, functionality, and operation of possible implementations of systems, methods and computer program products according to various embodiments of the present application. In this regard, each block in the flowchart or block diagrams may represent a module, program segment, or portion of code that contains one or more executable instructions for implementing the specified logical functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It is also noted that each block of the block diagrams and/or flowchart, and combinations of blocks in the block diagrams and/or flowchart, can be implemented in dedicated hardware-based systems that perform the specified functions or operations, or can be implemented in a combination of dedicated hardware and computer instructions.

The units involved in the embodiments of the present application may be implemented in a software manner, and may also be implemented in a hardware manner. The described unit may also be provided in the processor, for example, it may be described as: a processor, including a first determining unit, a second determining unit, a converting unit and a generating unit. The names of these units do not constitute a limitation of the unit itself under certain circumstances. For example, the second determining unit may also be described as a unit configured to determine timbre characteristic.

The functions described above can be performed at least partially by one or more hardware logic components. For example, unrestricted, the types of hardware logic components that can be used include field programmable gate arrays (FPGA), dedicated integrated circuits (ASIC), dedicated standard products (ASSPs), on-chip systems (SOCs), complex programmable logic devices (CPLDs), and so on.

In accordance with one or more embodiments of the present disclosure, a speech generating method is provided, comprising: determining starting time and ending time of each speaking speech fragment in the original speech by performing speaker segmentation on an original speech to obtain a segmented speech; determining a voiceprint feature vector corresponding to each speaking speech fragment in the original speech; converting a text corresponding to each speaking speech fragment in the original speech into a target language text, to obtain the target language text corresponding to each speaking speech fragment in the original speech; and generating a target speech based on the starting time and ending time of each speaking speech fragment in the original speech, the voiceprint feature vector corresponding to each speaking speech fragment and the target language text corresponding to the speaking speech fragment.

In accordance with one or more embodiments of the present disclosure, determining the voiceprint feature vector corresponding to each speaking speech fragment in the original speech comprises: determining the voiceprint feature vector corresponding to each speaking speech fragment in the original speech by performing speaker clustering on the segmented speech.

In accordance with one or more embodiments of the present disclosure, generating the target speech based on the starting time and ending time of each speaking speech fragment in the original speech, the voiceprint feature vector corresponding to each speaking speech fragment and the target language text corresponding to the speaking speech fragment comprises: generating a target speaking speech fragment based on the voiceprint feature vector corresponding to each speaking speech fragment in the original speech and the target language text corresponding to the speaking speech fragment, to obtain a target speaking speech fragment set.

In accordance with one or more embodiments of the present disclosure, generating the target speech based on the starting time and ending time of each speaking speech fragment in the original speech, the voiceprint feature vector corresponding to each speaking speech fragment and the target language text corresponding to the speaking speech fragment further comprises: splicing the target speaking speech fragments in the target speaking speech fragment set based on the starting time and ending time of each speaking speech fragment in the original speech, to obtain the target speech.

In accordance with one or more embodiments of the present disclosure, generating the target speaking speech fragment based on the voiceprint feature vector corresponding to each speaking speech fragment in the original speech and the target language text corresponding to the speaking speech fragment comprises: inputting the voiceprint feature vector corresponding to the speaking speech fragment and the target language text corresponding to the speaking speech fragment into a pre-trained speech synthesis network to obtain the target speaking speech fragment.

In accordance with one or more embodiments of the present disclosure, splicing the target speaking speech fragments in the target speaking speech fragment set based on the starting time and ending time of each speaking speech fragment in the original speech, to obtain the target speech comprises: determining the starting time and ending time of the speaking speech fragment as starting time and ending time of the corresponding target speech fragment; and generating a silent speech fragment between every two adjacent target speech fragments, wherein a duration of the silent speech fragment is a difference between the starting time of the latter target speech fragment in the two adjacent target speech fragments and the ending time of the former target speech fragment.

In accordance with one or more embodiments of the present disclosure, before converting the text corresponding to each speaking speech fragment in the original speech into the target language text, the method comprises: performing speech recognition and automatic sentence division on the original speech, to obtain the text corresponding to each speaking speech fragment in the original speech.

In accordance with one or more embodiments of the present disclosure, a speech generating apparatus is provided, comprising: a first determining unit configured to determine starting time and ending time of each speaking speech fragment in the original speech by performing speaker segmentation on an original speech to obtain a segmented speech; a second determining unit configured to determine a voiceprint feature vector corresponding to each speaking speech fragment in the original speech; a converting unit configured to convert a text corresponding to each speaking speech fragment in the original speech into a target language text, to obtain the target language text corresponding to each speaking speech fragment in the original speech; and a generating unit configured to generate a target speech based on the starting time and ending time of each speaking speech fragment in the original speech, the voiceprint feature vector corresponding to each speaking speech fragment and the target language text corresponding to the speaking speech fragment.

In accordance with one or more embodiments of the present disclosure, the second determining unit is further configured to: determine, by performing speaker clustering on the segmented speech, the voiceprint feature vector corresponding to each speaking speech fragment in the original speech.

In accordance with one or more embodiments of the present disclosure, the generating unit is further configured to: generate, based on the voiceprint feature vector corresponding to each speaking speech fragment in the original speech and the target language text corresponding to the speaking speech fragment, a target speaking speech fragment, and obtain a target speaking speech fragment set.

In accordance with one or more embodiments of the present disclosure, the generating unit is further configured to: generate, based on the voiceprint feature vector corresponding to each speaking speech fragment in the original speech and the target language text corresponding to the speaking speech fragment, a target speaking speech fragment, and obtain a target speaking speech fragment set; and splice, based on the starting time and ending time of each speaking speech fragment in the original speech, the target speaking speech fragments in the target speaking speech fragment set, and obtain the target speech.

In accordance with one or more embodiments of the present disclosure, the generating unit is further configured to: input the voiceprint feature vector corresponding to the speaking speech fragment and the target language text corresponding to the speaking speech fragment into a pre-trained speech synthesis network to obtain the target speaking speech fragment and obtain a target speaking speech fragment set; and splice, based on the starting time and ending time of each speaking speech fragment in the original speech, the target speaking speech fragments in the target speaking speech fragment set, and obtain the target speech.

In accordance with one or more embodiments of the present disclosure, the generating unit is further configured to: generate, based on the voiceprint feature vector corresponding to each speaking speech fragment in the original speech and the target language text corresponding to the speaking speech fragment, a target speaking speech fragment, and obtain a target speaking speech fragment set; determine the starting time and ending time of the speaking speech fragment as starting time and ending time of the corresponding target speech fragment; and generate a silent speech fragment between every two adjacent target speech fragments, wherein a duration of the silent speech fragment is a difference between the starting time of the latter target speech fragment in the two adjacent target speech fragments and the ending time of the former target speech fragment.

In accordance with one or more embodiments of the present disclosure, the apparatus further includes: a speech recognition and automatic sentence division unit, configured to perform speech recognition and automatic sentence division on the original speech, and obtain the text corresponding to each speaking speech fragment in the original speech.

In accordance with one or more embodiments of the present disclosure, the second determining unit is further configured to determine at least one speaking speech fragment of speaker represented by each speaker information in the speaker information set described above; For each speaker represented by each speaker information in the above speaker information set, the timbre feature of the above speaker are extracted from at least one speaking speech fragment of the above speaker to obtain a set of timbre feature.

In accordance with one or more embodiments of the present disclosure, the generating unit is further configured to determine the corresponding intonation feature of the target language text as the intonation feature of the target speech.

In accordance with one or more embodiments of the present disclosure, the generating unit is further configured to determine the semantic information in the target language text as the semantic information of the target speech.

In accordance with one or more embodiments of the present disclosure, the generating unit is further configured to determine the start and end times of each set of start and end times in the set of start and end times as the start and end times of the speaking speech fragment in the corresponding target speech.

In accordance with one or more embodiments of the present disclosure, the generating unit is further configured to determine each timbre feature in the above set of timbre feature as the timbre feature of at least one speaking speech segment in the corresponding target speech.

In accordance with one or more embodiments of the present disclosure, the generating unit is further configured to generate the above target speech based on the intonation characteristic of the target speech, the semantic information of the target speech, the start and end times of each speaking speech fragment in the target speech, and the timbre characteristic of each speaking speech fragment in the target speech.

In accordance with one or more embodiments of the present disclosure, an electronic device is provided, including: one or more processors; and a storage apparatus, one or more programs are stored therein. The one or more programs, when executed by the one or more processors, cause the one or more processors to implement any one of the above methods.

In accordance with one or more embodiments of the present disclosure, a computer readable medium is provided, computer programs are stored therein. The programs, when executed by a processor, cause the processor to implement any one of the above methods.

The above description is only a preferred embodiment of the present application and an illustration of the applied technical principles. It should be understood by those skilled in the art that the scope of the disclosure involved in the embodiments of the present application is not limited to the technical solution formed by the specific combination of the above technical features, and should also cover, without departing from the above inventive concept, the above Other technical solutions formed by any combination of technical features or their equivalent features. For example, a technical solution is formed by replacing the above features with the technical features disclosed (but not limited to) in the embodiments of the present application with similar functions.

What is claimed is:

1. A speech generating method, comprising:
    determining starting time and ending time of each speaking speech fragment in original speech by performing speaker segmentation on the original speech to obtain segmented speech;
    determining a voiceprint feature vector corresponding to each speaking speech fragment in the original speech;
    converting a text corresponding to each speaking speech fragment in the original speech into a target language text, to obtain the target language text corresponding to each speaking speech fragment in the original speech; and
    generating target speech based on the starting time and the ending time of each speaking speech fragment in the original speech, the voiceprint feature vector corresponding to each speaking speech fragment, and the target language text corresponding to each speaking speech fragment, wherein generating the target speech comprises:

generating a set of target speaking speech fragments based on the voiceprint feature vector and the target language text corresponding to each speaking speech fragment in the original speech, determining the starting time and the ending time of each speaking speech fragment as starting time and ending time of a corresponding target speaking speech fragment, and generating a silent speech fragment between every two adjacent target speaking speech fragments, wherein a duration of the silent speech fragment is determined based on a difference between starting time of a latter target speaking speech fragment and ending time of the former target speaking speech fragment in the two adjacent target speaking speech fragments.

2. The method according to claim 1, wherein determining the voiceprint feature vector corresponding to each speaking speech fragment in the original speech comprises:

determining the voiceprint feature vector corresponding to each speaking speech fragment in the original speech by performing speaker clustering on the segmented speech.

3. The method according to claim 1, further comprising:

splicing the set of target speaking speech fragments based on the starting time and the ending time of each speaking speech fragment in the original speech to obtain the target speech.

4. The method according to claim 1, further comprising:

inputting the voiceprint feature vector corresponding to each speaking speech fragment and the target language text corresponding to each speaking speech fragment into a pre-trained speech synthesis network to obtain the set of target speaking speech fragments.

5. The method according to claim 1, wherein before converting the text corresponding to each speaking speech fragment in the original speech into the target language text, the method comprises:

performing speech recognition and automatic sentence division on the original speech, to obtain the text corresponding to each speaking speech fragment in the original speech.

6. An electronic device, comprising:

one or more processors; and a memory, storing one or more programs therein; wherein the one or more programs, when executed by the one or more processors, cause the one or more processors to implement operations comprising:

determining starting time and ending time of each speaking speech fragment in original speech by performing speaker segmentation on the original speech to obtain segmented speech;

determining a voiceprint feature vector corresponding to each speaking speech fragment in the original speech;

converting a text corresponding to each speaking speech fragment in the original speech into a target language text, to obtain the target language text corresponding to each speaking speech fragment in the original speech; and generating target speech based on the starting time and the ending time of each speaking speech fragment in the original speech, the voiceprint feature vector corresponding to each speaking speech fragment, and the target language text corresponding to each speaking speech fragment, wherein generating the target speech comprises:

generating a set of target speaking speech fragments based on the voiceprint feature vector and the target language text corresponding to each speaking speech fragment in the original speech, determining the starting time and the ending time of each speaking speech fragment as starting time and ending time of a corresponding target speaking speech fragment, and generating a silent speech fragment between every two adjacent target speaking speech fragments, wherein a duration of the silent speech fragment is determined based on a difference between starting time of a latter target speaking speech fragment and ending time of the former target speaking speech fragment in the two adjacent target speaking speech fragments.

7. A non-transitory computer readable medium, storing a computer program therein, wherein the program, when executed by a processor, cause the processor to implement operations comprising:

determining starting time and ending time of each speaking speech fragment in original speech by performing speaker segmentation on the original speech to obtain segmented speech;

determining a voiceprint feature vector corresponding to each speaking speech fragment in the original speech;

converting a text corresponding to each speaking speech fragment in the original speech into a target language text, to obtain the target language text corresponding to each speaking speech fragment in the original speech; and generating target speech based on the starting time and the ending time of each speaking speech fragment in the original speech, the voiceprint feature vector corresponding to each speaking speech fragment, and the target language text corresponding to each speaking speech fragment, wherein generating the target speech comprises:

generating a set of target speaking speech fragments based on the voiceprint feature vector and the target language text corresponding to each speaking speech fragment in the original speech, determining the starting time and the ending time of each speaking speech fragment as starting time and ending time of a corresponding target speaking speech fragment, and generating a silent speech fragment between every two adjacent target speaking speech fragments, wherein a duration of the silent speech fragment is determined based on a difference between starting time of a latter target speaking speech fragment and ending time of the former target speaking speech fragment in the two adjacent target speaking speech fragments.

8. The electronic device according to claim 6, wherein determining the voiceprint feature vector corresponding to each speaking speech fragment in the original speech comprises:

determining the voiceprint feature vector corresponding to each speaking speech fragment in the original speech by performing speaker clustering on the segmented speech.

9. The electronic device according to claim 6, the operations further comprising:

splicing the set of target speaking speech fragments based on the starting time and the ending time of each speaking speech fragment in the original speech to obtain the target speech.

10. The electronic device according to claim 6, the operations further comprising:

inputting the voiceprint feature vector corresponding to each speaking speech fragment and the target language text corresponding to each speaking speech fragment into a pre-trained speech synthesis network to obtain the set of target speaking speech fragments.

11. The electronic device according to claim 6, wherein before converting the text corresponding to each speaking speech fragment in the original speech into the target language text, the operations comprise:

performing speech recognition and automatic sentence division on the original speech, to obtain the text corresponding to each speaking speech fragment in the original speech.

12. The non-transitory computer readable medium according to claim 7, wherein determining the voiceprint feature vector corresponding to each speaking speech fragment in the original speech comprises:

determining the voiceprint feature vector corresponding to each speaking speech fragment in the original speech by performing speaker clustering on the segmented speech.

13. The non-transitory computer readable medium according to claim 7, the operations further comprising:

splicing the set of target speaking speech fragments based on the starting time and the ending time of each speaking speech fragment in the original speech to obtain the target speech.

14. The non-transitory computer readable medium according to claim 7, the operations further comprising:

inputting the voiceprint feature vector corresponding to each speaking speech fragment and the target language text corresponding to each speaking speech fragment into a pre-trained speech synthesis network to obtain the set of target speaking speech fragments.

15. The non-transitory computer readable medium according to claim 7, wherein before converting the text corresponding to each speaking speech fragment in the original speech into the target language text, the operations comprise:

performing speech recognition and automatic sentence division on the original speech, to obtain the text corresponding to each speaking speech fragment in the original speech.

* * * * *